United States Patent [19]

Irani

[11] 3,839,221

[45] Oct. 1, 1974

[54] PREPARATION OF SILICA SOLS OF MINIMUM TURBIDITY

[75] Inventor: Farhad Ardeshir Irani, Park Forest, Ill.

[73] Assignee: E. I. du Pont de Nemours and Company, Wilmington, Del.

[22] Filed: June 21, 1972

[21] Appl. No.: 264,950

Related U.S. Application Data

[63] Continuation-in-part of Ser. No. 165,786, July 15, 1971.

[52] U.S. Cl. ............. 252/313 S, 106/287 S, 210/32
[51] Int. Cl. ...................... B01j 13/00, C01b 33/14
[58] Field of Search .............. 252/313 S; 260/2.2 R; 210/32; 423/341

[56] References Cited
UNITED STATES PATENTS

| | | |
|---|---|---|
| 1,426,890 | 8/1922 | McClenahan .................. 423/341 X |
| 2,504,695 | 4/1950 | Jukkola et al. .................. 210/32 X |
| 2,631,134 | 3/1953 | Iler et al. ......................... 252/313 S |
| 2,858,277 | 10/1958 | Hunter............................ 252/313 S |
| 2,974,109 | 3/1961 | Dirnberger et al. ............. 252/313 S |

*Primary Examiner*—Richard D. Lovering

[57] ABSTRACT

Processes for reducing the turbidity of silica sols prepared by neutralizing the alkali in an alkali metal silicate solution with a cation-exchange resin in the hydrogen form are provided. The processes comprise a pretreatment of the resin while it is in the expanded, sodium form with a silica extraction agent which is an aqueous solution of hydrogen fluoride, an alkali metal bifluoride or ammonium bifluoride.

9 Claims, No Drawings

PREPARATION OF SILICA SOLS OF MINIMUM TURBIDITY

RELATIONSHIP TO OTHER APPLICATIONS

This application is a continuation-in-part of my co-pending application Ser. No. 165,786, filed July 15, 1971.

BACKGROUND OF THE INVENTION

1. Field of Invention

This invention relates to processes for preparing silica sols and, more particularly, to such processes in which the alkali in an alkali metal silicate solution is neutralized with a cation-exchanger in the hydrogen form.

2. Prior Art

Silica sols have been made by neutralizing the alkali of an alkali metal silicate solution with a cation-exchanger. U.S. Pat. No. 2,244,325 to Bird, U.S. Pat. No. 2,431,481 to Hurd, U.S. Pat. No. 2,631,134 to Iler et al., and U.S. Pat. No. 2,974,109 to Dirnberger et al., show such processes. The aforementioned patent application claims the use of such a cation-exchanger to make large particle silica sols.

In the process of the Bird Patent and in similar processes using the hydrogen form of a cation-exchanger, a solution of an alkali metal silicate is brought into contact with the cation-exchanger at a pH which is initially quite high. After the cation-exchanger has been effected, the pH ends up at a low figure, usually in the range of pH 3 to 5 in commercial operations. In such processes alkali is ordinarily added after the exchange to stabilize the sols. Sols cannot be made by such processes which have an $SiO_2$ content above 3 or 4 percent, as they leave the cation-exchanger, because they will gel in contact with the cation-exchanger at higher concentrations. Alkali can be added to the sols so made and then they can be concentrated. These sols are fairly stable at $SiO_2$ contents up to about 15 percent.

Silica sols prepared by neutralization of an alkali metal silicate solution with a cation-exchanger can be markedly improved by causing a growth of the silica particles to form dense, uniform, discrete particles. This process is described in U.S. Pat. No. 2,574,902 to Bechtold et al. The processes of Bechtold et al. are characterized by heating of a portion of sol and thereafter adding at least five times as much silica as was originally present by the addition of further quantities of sol.

U.S. Pat. No. 2,631,134 permits the direct production of sols of higher $SiO_2$ content than those which can be prepared by the above-described processes using the hydrogen form of a cation-exchanger. In this process an alkali metal silicate solution can be treated with a cation-exchanger in the hydrogen form to produce a silica sol directly which contains a much higher $SiO_2$ concentration than can be obtained by the earlier-described processes using such an exchanger resin.

The process described in U.S. Pat. No. 2,974,109, a variation of the process of Iler et al., produces silica sols which have minimum turbidity and are substantially water-clear. Such sols are produced directly in relatively concentrated form by processes in which the alkali in an alkali metal silicate solution is neutralized with a cation-exchanger in the hydrogen form at a pH above 8 while agitating the exchanger, provided certain of the reaction conditions are controlled within narrow limits. Sols are produced ranging in particle size from 10 millimicrons or below up to about 130 millimicrons average diameter.

While the latter patent commonly produces silica sols of minimum turbidity, with continued cycling of the resin, there is build-up of silica within the pores and outside shell that eventually contributes to an increase in sol turbidity. There is a need, therefore, on occasions, to be able to reduce turbidity to minimum levels.

SUMMARY OF THE INVENTION

According to the present invention there is provided a process for preparing a silica sol wherein the alkali in an alkali metal silicate solution is neutralized with a cation-exchanger resin in the hydrogen form while maintaining a pH greater than 8 which comprises separating the silica sol from the resin, contacting the separated resin with a silica extraction agent selected from the group consisting of an aqueous solution of hydrogen fluoride, an alkali metal bifluoride, ammonium bifluoride and an alkali metal hydroxide for a time sufficient to reduce the silica content of the resin. This treatment reduces extraneous silica nuclei from the process and allows a minimum turbidity silica sol to be produced.

DETAILED DESCRIPTION OF THE INVENTION

The preparation of silica sols by neutralizing the alkali of an alkali metal silicate solution, particularly sodium silicate, with a cation-exchange resin is well known in the art. The process of the invention will be operated at a pH greater than 8 (usually 8 to 10). A temperature between 60° and 150°C. is generally used and will normally be between 90° and 100°C. A sulfonic or carboxylic acid cation exchange resin is generally preferred. U.S. Pat. Nos. 2,631,134 and 2,974,109 are most illustrative of this process, of which the present invention is an improvement, and their disclosures are hereby incorporated by reference. The process conditions of U.S. Pat. No. 2,974,109 are particularly preferred. My aforementioned copending application is applicable when large particle silica sols are desired.

In carrying out any of the above-mentioned processes, the cation-exchanger resin is initially in the hydrogen form. After the silica sol has been prepared, the resin is then exhausted and in the expanded, sodium form, and generally is then regenerated and rinsed. At this stage, the process of the present invention is used to remove as much extraneous silica nuclei held in the fine pores of the resin as is possible to further improve homogeneity and clarity of the final silica sol.

The process is best carried out with the resin in the expanded, sodium form prior to regeneration, since the swollen resin pores allow for improved silica extraction. After rinsing with water to separate any large silica particles, the expanded, sodium form resin is contacted with a silica extraction agent which is an aqueous solution of hydrogen fluoride, an alkali metal bifluoride, ammonium bifluoride or an alkali metal hydroxide. The resin is contacted for a time sufficient to reduce the silica content of the resin. Depending upon the temperatures and times used, substantially all of the silica can be removed. Improvement in turbidity is noted, however, when the silica is reduced to below about 5 percent by weight (dry basis).

The preferred silica extraction agent is a 5 to 15 percent by weight ammonium bifluoride solution which is agitated with the expanded resin for up to 2 hours at a temperature over 90°C., but less than the solution boiling point. Generally, a treatment time of 1 hour at 95°C. with a 10 percent solution is sufficient. Greater contact times do not appear to give any significant increase in silica removal efficiency at these elevated temperatures. The resin can be treated at room temperature provided the contact time is long enough, e.g., up to 20 hours or more may be required. An excess of extraction agent is normally used, e.g., preferably from 125 to 150 percent of the stoichiometric amount of bifluoride needed in the following equation is used:

$$3\ NH_4F \cdot HF + SiO_2 \rightarrow (NH_4)_2SiF_6 + NH_4OH + H_2O$$

Besides extracting silica particles from the resin, the treatment loosens the build-up of larger siliceous matter on the resin and allows it to be hydraulically separated from the bed. After treatment, the resin is washed, regenerated to the hydrogen form and reused.

Sol turbidity and specific surface area are measured as defined in my copending application. To determine the specific surface area, $S$, the product is titrated as described by G. W. Sears in Analytical Chemistry 28, 1981 (1956). The number average particle diameter, $D$, can then be obtained from the relationship $D = K/S$, where $D$ is expressed in millimicrons, and $S$ is expressed in $m^2/g$ $SiO_2$. $K$ is a constant dependent on the density of silica and varies from about 2,700 to about 3,000. For convenience, the value of $K = 3,000$ is used throughout this disclosure in all calculations. This relationship is discussed in R. K. Iler, The Colloid Chemistry of Silicon and Silicates, Cornell University Press, 1955.

The sol turbidity $\tau$ is defined as in $(I_o/I)/L$, where the incident light intensity is $I_o$; the transmitted light intensity is $I$; and the length of the light path through the sample is $L$. The turbidity can be determined by measuring the light transmitted by the sol on the log scale of a Fisher Electrophotometer AC model, using a B-525 green filter and a 23 ml. cylindrical cell. The reference cell contains distilled water. The scale reading is multiplied by a calibration factor to give turbidity. When the exhausted cation-exchange resin is pretreated according to the present invention before being reused, turbidity values as low as 2 to 5 $cm^{-1}$ can be achieved.

The invention can be further understood by the following examples in which parts and percentages are by weight unless otherwise indicated.

EXAMPLE 1

A carboxylic acid cation-exchange resin in the sodium form was cooked in a reactor (equipped with an agitator and high temperature pH electrode) for 1 hour with 125 percent stoichiometric quantity of ammonium bifluoride as a 10 percent aqueous solution. The resin was rinsed well with water and regenerated to the hydrogen form and then vacuum filtered to remove entrained water.

The cleaned reactor was filled with 1,425 ml. of water and heated to 95°C. by direct steam injection.

The treated hydrogen form resin and a sodium silicate solution ($SiO_2:Na_2O = 3.25:1$) containing about 28.4 percent $SiO_2$ were added simultaneously at a constant rate of addition to maintain a reaction pH of 9.0 ± 0.3. At the same time, the reactor temperature was maintained at 95° ± 0.5°C. by direct steam injection. Agitation of the reactor was continuous.

After 45 minutes of operation in this manner, the resin and silicate feeds were stopped, the hot sol siphoned out, vacuum filtered and cooled. A total of 715 ml. of silicate solution and 800 ml. of resin were added. The sol so formed had a strength of 10.21 percent $SiO_2$, a specific surface area of 273 $m^2/g$. and a turbidity of 4.8 $cm^{-1}$.

This example was repeated, except the exhausted resin was not pretreated with ammonium bifluoride solution before it was regenerated. The sol so formed had a strength of 12.54 percent $SiO_2$, a specific surface area of 272 $m^2/g$. and a turbidity of 12 $cm^{-1}$.

EXAMPLE 2

Example 1 was repeated. In this example the sol analyzed 10.57 percent $SiO_2$ and was determined to have a specific surface area of 252 $m^2/g$. and a tubidity of 2.9 $cm^{-1}$.

What is claimed is:

1. In a process for preparing a minimum turbidity silica sol wherein the alkali in an alkali metal silicate solution is neutralized with a cation-exchange resin in the hydrogen form while maintaining a pH greater than 8, the improvement comprising: pretreating the resin with a silica extraction agent selected from the group consisting of an aqueous solution of hydrogen fluoride, an alkali metal bifluoride and ammonium bifluoride for a time sufficient to reduce the silica content of the resin.

2. The process of claim 1 wherein the resin is pretreated for up to 2 hours at a temperature greater than 90°C. with an aqueous solution of ammonium bifluoride.

3. The process of claim 2 wherein the aqueous solution of ammonium bifluoride has a concentration of ammonium bifluoride in the range of about 5 to 15 percent by weight.

4. The process of claim 3 wherein the alkali metal silicate solution is a sodium silicate solution.

5. The process of claim 4 wherein the sodium silicate solution is neutralized at a temperature in the range of 60° to 150°C. and a pH in the range of 8 to 10.

6. The process of claim 5 wherein the temperature is in the range of 90° to 100°C.

7. The process of claim 6 wherein the cation-exchange resin is a sulfonic or carboxylic acid cation-exchange resin.

8. The process of claim 1 wherein the resin is pretreated with hydrogen fluoride.

9. The process of claim 1 wherein the resin is pretreated with an alkali metal bifluoride.

* * * * *